July 23, 1935. H. EWEST 2,009,223
GASEOUS ELECTRIC DISCHARGE LAMP DEVICE
Filed May 25, 1934
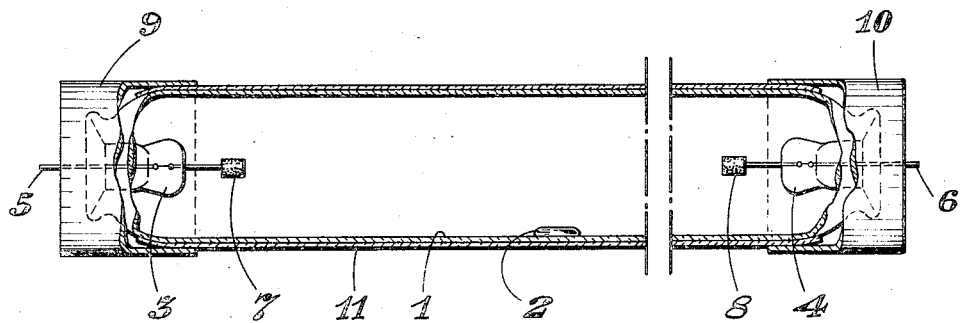
INVENTOR
Hans Ewest
BY Harry E. Dunham
ATTORNEY Patented July 23, 1935

2,009,223

UNITED STATES PATENT OFFICE 2,009,223

GASEOUS ELECTRIC DISCHARGE LAMP DEVICE

Hans Ewest, Berlin-Lichterfelde Ost, Germany, assignor to General Electric Company, a corporation of New York Application May 25, 1934, Serial No. 727,529
In Germany June 10, 1933

3 Claims. (Cl. 176—122)

The present invention relates to gaseous electric discharge lamp devices generally and more particularly the invention relates to such devices useful in the production of yellow colored light.

In United States Patent Number 1,971,941, granted August 28, 1934 to Marcello Pirani, there is disclosed an apparatus which emits a pure or typical yellow light, said apparatus comprising a mercury vapor lamp, a yellow filter and a translucent glass in operative relation to said lamp.

The object of the present invention is to provide a more effective and more efficient apparatus for the production of yellow light than that described above. Still further objects and advantages attaching to the device and to its use and operation will be apparent to those skilled in the art from the following particular description.

In accordance with these objects the invention comprises a mercury vapor lamp, a yellow fluorescent filter and a translucent glass in operative relation to said lamp. The arrangement of the lamp, the yellow filter and the translucent glass is critical when the filter has fluorescent qualities because the yellow fluorescent filter not only transmits the yellow light emitted by the mercury vapor lamp but also changes a large part of the green, blue and ultra-violet rays emitted by the lamp into yellow light. Thus the arrangement of the lamp, the filter and the translucent glass must be such that the light from the lamp passes first through the filter and then through the translucent glass. Since the spectrum of the light emitted by a mercury vapor lamp is rich in green, blue and ultra-violet rays the use of a filter which changes such rays into yellow rays increases the efficiency of the apparatus. The translucent glass disperses and weakens any green and blue rays which should pass unchanged through the filter so that the light emitted by the apparatus is a pure or typical yellow.

An apparatus embodying my invention is one comprising a mercury vapor lamp having a container made of clear glass, that is, a glass which transmits all the light generated by said lamp, a yellow fluorescent filter mounted so that the light emitted by the lamp strikes said filter, and a translucent glass, such as a matte or opal glass, mounted in such manner that the light from said lamp passes first through said filter and then through said glass. It is advantageous to combine the filter and the translucent glass in the form of a two layer body and mount this body in such manner that the yellow filter layer is closer to the lamp than the translucent glass layer. In another embodiment of my invention the lamp container is a yellow, fluorescent filter and a translucent glass is mounted between said lamp and the observer.

In the preferred embodiment of my invention, however, the container of the mercury vapor lamp consists wholly or in part of a yellow, fluorescent glass and a coating or glaze of translucent glass is applied to the outside of said container.

In the drawing accompanying and forming part of this specification the preferred embodiment of my invention is shown in a front elevational, partly sectional view.

Referring to the drawing the new and novel gaseous electric discharge lamp device for efficiently producing typical yellow light comprises a tubular container 1 made of a yellow, fluorescent glass. Said container 1 has a gaseous atmosphere therein comprising mercury vapor and is, for example, a mixture of a starting rare gas, such as argon or neon, and mercury vapor. The mercury pool 2 is the source of the mercury vapor. When the lamp device is started into operation the electric discharge therein is conducted by the rare gas until the heat of the discharge vaporizes the mercury of pool 2. The spectrum of the light emitted by the mercury vapor discharge predominates over the spectrum of the light emitted by the rare gas during the operation of the device. Current leads 5 and 6 having electrodes 7 and 8 mounted thereon respectively are sealed into the stems 3 and 4 respectively of said container 1. Said electrodes 7 and 8 are of the sintered, mixed metal and oxide type and are electron emitting when heated. Base members 9 and 10 are provided at the ends of said container 1. A coating 11 of translucent glass, such as matte glass or opal glass is applied to the container 1 and completely covers said container 1 between the bases 9 and 10. A lamp device having the above structure emits light of a typical yellow color from all parts thereof and is a very efficient source of yellow light.

While I have shown and described and have pointed out in the annexed claims certain novel features of the invention, it will be understood that various omissions, substitutions and changes in the forms and details of the device illustrated and in its use and operation may be made by those skilled in the art without departing from the broad spirit and scope of the invention, for example, different types of electrodes such as cold sheet metal electrodes, liquid electrodes, or heated electrodes can be used in place of those shown and described, when desired.

What I claim as new and desire to secure by Letters Patent of the United States is:—

1. A gaseous electric discharge lamp device comprising a yellow, fluorescent glass container, electrodes sealed therein, a gaseous atmosphere therein comprising mercury vapor, and a translucent glass coating on said container, said container and said coating screening out the light other than the yellow light emitted by the discharge in said lamp, said container changing the light other than the yellow light emitted by said discharge into yellow light.

2. In combination, a gaseous electric discharge lamp device comprising a yellow, fluorescent glass container, electrodes sealed therein, a gaseous atmosphere therein comprising mercury vapor, and a translucent glass in operative relation to said device, said container and said glass screening out the light other than the yellow light emitted by the discharge in said lamp, said container changing the light other than the yellow light emitted by said discharge into yellow light.

3. In combination a mercury vapor lamp, a yellow, fluorescent filter and a translucent glass in operative relation thereto said filter being interposed between said lamp and said translucent glass, said filter and said glass screening out the light other than the yellow light emitted by said lamp, said filter changing the light other than the yellow light emitted by said lamp into yellow light.

HANS EWEST.